US009922577B2

(12) United States Patent
Baker et al.

(10) Patent No.: US 9,922,577 B2
(45) Date of Patent: Mar. 20, 2018

(54) MEDICAMENT DELIVERY TRAINING DEVICE

(71) Applicants: Jeff Baker, Orlando, FL (US); Paul van der Pol, Winter Garden, FL (US)

(72) Inventors: Jeff Baker, Orlando, FL (US); Paul van der Pol, Winter Garden, FL (US)

(73) Assignee: JBCB HOLDINGS, LLC, Orlando, FL (US)

( * ) Notice: Subject to any disclaimer, the term of this patent is extended or adjusted under 35 U.S.C. 154(b) by 150 days.

(21) Appl. No.: 14/287,908

(22) Filed: May 27, 2014

(65) Prior Publication Data

US 2014/0335495 A1 Nov. 13, 2014

Related U.S. Application Data

(63) Continuation of application No. 13/650,676, filed on Oct. 12, 2012.

(60) Provisional application No. 61/620,168, filed on Apr. 4, 2012.

(51) Int. Cl.
G09B 23/28 (2006.01)
G09B 19/00 (2006.01)

(52) U.S. Cl.
CPC .......... *G09B 23/285* (2013.01); *G09B 19/00* (2013.01)

(58) Field of Classification Search
CPC .................................................. G09B 23/285
See application file for complete search history.

(56) References Cited

U.S. PATENT DOCUMENTS

| 5,447,685 | A | * | 9/1995 | Sievert | .................... A61L 11/00 241/23 |
| 6,997,906 | B2 | | 2/2006 | Langley et al. | |
| 7,704,231 | B2 | | 4/2010 | Pongpairochana et al. | |
| 7,740,612 | B2 | | 6/2010 | Hochman | |
| 8,088,096 | B2 | | 1/2012 | Lauchard et al. | |
| 8,105,283 | B2 | | 1/2012 | Perriere | |
| 9,443,445 | B2 | | 9/2016 | Laurusonis et al. | |
| 2008/0059133 | A1 | * | 3/2008 | Edwards | .............. G09B 23/285 703/7 |
| 2012/0253314 | A1 | | 10/2012 | Harish et al. | |

* cited by examiner

*Primary Examiner* — Sam Yao
*Assistant Examiner* — Evan Page
(74) *Attorney, Agent, or Firm* — Timothy H. Van Dyke; Beusse, Wolter, Sanks & Maire PLLC

(57) ABSTRACT

A medicament delivery training device configured to provide stepwise instructions for using the device to a user in a sequence of steps is provided in an embodiment herein. The medicament delivery training device includes a housing, a sensor, a microprocessor, a storage medium component associated with the microprocessor comprising a database of instructions pertaining to the sequence of steps for using the device stored thereon, one or more program code modules stored on the microprocessor or the storage medium component wherein the one or more program code modules comprise a first program code module for causing the microprocessor to provide a first instruction, and a second program code module for causing the microprocessor to provide a subsequent instruction based on a current register.

17 Claims, 4 Drawing Sheets

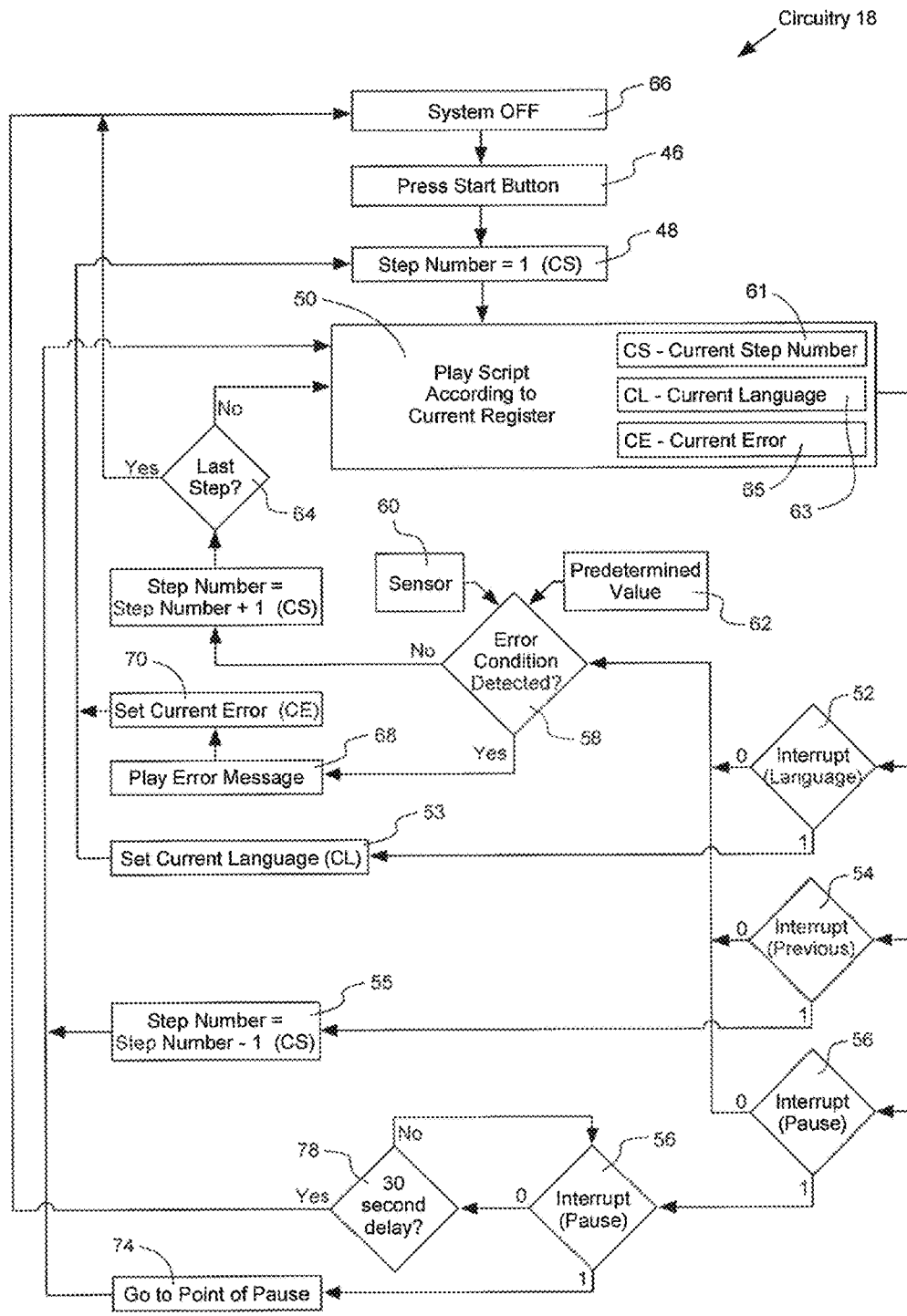

FIG. 4

| CS = 1 | Instruction 1 |
| CL = 0 | English |
| CE = 0 | No emphasis |

| CS = 1 | Instruction 1 |
| CL = 0 | English |
| CE = 1 | With emphasis |

| CS = 2 | Instruction 2 |
| CL = 0 | English |
| CE = 0 | No emphasis |

| CS = 2 | Instruction 2 |
| CL = 0 | English |
| CE = 1 | With emphasis |

| CS = 3 | Instruction 3 |
| CL = 0 | English |
| CE = 0 | No emphasis |

| CS = 3 | Instruction 3 |
| CL = 0 | English |
| CE = 1 | With emphasis |

| CS = 4 | Instruction 4 |
| CL = 0 | English |
| CE = 0 | No emphasis |

| CS = 4 | Instruction 4 |
| CL = 0 | English |
| CE = 1 | With emphasis |

| CS = 5 | Instruction 5 |
| CL = 0 | English |
| CE = 0 | No emphasis |

| CS = 5 | Instruction 5 |
| CL = 0 | English |
| CE = 1 | With emphasis |

| CS = 6 | Instruction 6 |
| CL = 0 | English |
| CE = 0 | No emphasis |

| CS = 6 | Instruction 6 |
| CL = 0 | English |
| CE = 1 | With emphasis |

| CS = 1 | Instruction 1 |
| CL = 1 | Spanish |
| CE = 0 | No emphasis |

| CS = 1 | Instruction 1 |
| CL = 1 | Spanish |
| CE = 1 | With emphasis |

| CS = 2 | Instruction 2 |
| CL = 1 | Spanish |
| CE = 0 | No emphasis |

| CS = 2 | Instruction 2 |
| CL = 1 | Spanish |
| CE = 1 | With emphasis |

| CS = 3 | Instruction 3 |
| CL = 1 | Spanish |
| CE = 0 | No emphasis |

| CS = 3 | Instruction 3 |
| CL = 1 | Spanish |
| CE = 1 | With emphasis |

| CS = 4 | Instruction 4 |
| CL = 1 | Spanish |
| CE = 0 | No emphasis |

| CS = 4 | Instruction 4 |
| CL = 1 | Spanish |
| CE = 1 | With emphasis |

| CS = 5 | Instruction 5 |
| CL = 1 | Spanish |
| CE = 0 | No emphasis |

| CS = 5 | Instruction 5 |
| CL = 1 | Spanish |
| CE = 1 | With emphasis |

| CS = 6 | Instruction 6 |
| CL = 1 | Spanish |
| CE = 0 | No emphasis |

| CS = 6 | Instruction 6 |
| CL = 1 | Spanish |
| CE = 1 | With emphasis |

MEDICAMENT DELIVERY TRAINING DEVICE

CROSS-REFERENCE TO RELATED APPLICATIONS

This application is related to U.S. application Ser. No. 13/650,676 filed on Oct. 12, 2012 to which priority is claimed in accordance with 35 USC 120. The entirety of the application is incorporated by reference herein.

BACKGROUND

Performing a medical treatment or test on oneself carries with it certain risks and often creates a level of anxiety for the user performing the treatment or test. It has proven beneficial in the medical field to practice various medical techniques including drug delivery, specifically where it relates to injections and other invasive methods of drug delivery prior to delivering the medications to a patient in need, particularly in the case of self-administration of medicaments. Training devices are helpful in reducing errors and anxiety associated with administering medical treatment, as well as increasing efficiency and accuracy in providing treatments to patients, specifically in the realm of self-administered medications. Medical devices are often intimidating to use; the fear associated with giving oneself an injection, for example, can be traumatic. This fear is increased in persons with little or no experience in self-administration of medications. Consequently, devices and methods to assist in training individuals to inject themselves or otherwise self-administer medications are beneficial and can decrease or prevent anxieties associated with medicament delivery. Medicament delivery training devices allow patients to practice giving themselves a full dose in a safe and effective manner.

BRIEF DESCRIPTION OF THE DRAWINGS

FIG. 3 is a flowchart of an exemplary operation of an embodiment of the logic executed on circuitry associated with the medicament delivery training device.

FIG. 4 provides a table representative of an exemplary embodiment of the circuitry provided at step 50 of FIG. 3.

DETAILED DESCRIPTION

Figure 1:
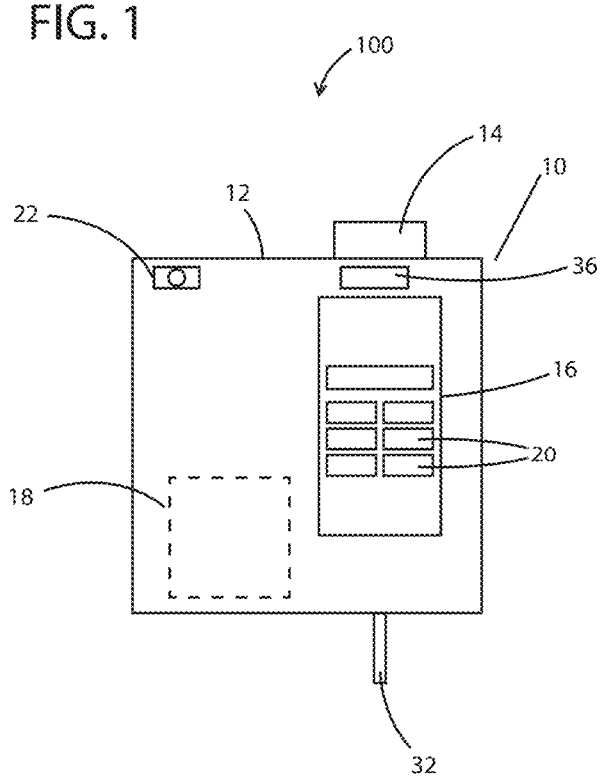
FIG. 1 provides a schematic of an embodiment of a medicament delivery training device.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

The inventors have identified a need for a training device to improve user comfort and confidence in self-delivery or self-administration of a full dose of medicament in a safe and effective manner. In addition to increasing confidence in self-administration in users by practicing with a training medicament delivery device, the inventors have identified additional benefits associated with multi-sensory learning regarding a medicament delivery training device. It has been discovered that multi-sensory learning establishes multiple pathways in separate areas in the brain and ultimately results in a highly effective learning experience. However, in order to gain benefits from multi-sensory learning devices, certain requirements must be met including but not limited to the following: the sources of stimuli must be in close proximity to one another; the sources of stimuli must be synchronous; the stimuli must be congruous semantically, otherwise the superior colliculus (area of the brain located in the midbrain known for integrating multiple sources of information) will segregate the stimuli instead of integrate them; and finally, the use of extraneous materials must be limited. Additionally, identification of user errors in the use of the device during the use of the device and communication of those errors to the user immediately after the error occurs is particularly beneficial in training a user to use the device. Furthermore, correction of those errors and/or requiring a user to start from the beginning of the sequence and correctly complete the step in which the error occurred before moving on to the subsequent step further enhances the learning experience for the user.

With knowledge of the essential factors in multi-sensory learning and incorporation of the multi-sensory learning features into a training device as well as the identification of and correction of user errors with practice using the device correctly and in a certain sequence, while requiring a user to start over at the beginning of the sequence when an error occurs, the inventors have developed a novel, cutting-edge medicament delivery training device. This training device is particularly beneficial for identifying and correcting errors in the use of the device by indicating to a user when an error is made, instructing a user how to correct the error and requiring the user to repeat the step in which the error occurred until the user correctly performs each step of the device. The features of the device developed by the inventors herein result in effectively training and teaching a user on the correct use of the device which consequently increases the user's comfort level in using the training device, and ultimately the medicament-containing device.

The medicament delivery training device embodiments described herein take advantage of the multisensory learning capabilities of the human brain. As such, the medicament delivery training device provides the means to stimulate primarily the visual, auditory and somatic systems of the human nervous system. The "medicament delivery training device" as described herein may include a device or a device and a peripheral (e.g. packaging), in non-limiting examples.

Visual stimuli or feedback can be generated mechanically or electronically. An example of a mechanically generated visual stimulus is a plunger moving past an inspection window or a shroud extending from the device. An example of an electronically generated visual stimulus is an LED blinking or an LCD display showing an icon.

Auditory stimuli or feedback can also be generated mechanically or electronically. An example of a mechanically generated auditory stimulus is the "click" that can be heard if two parts interlock. An example of an electronically generated auditory stimulus is a beeper or a speaker that plays spoken instructions.

Somatic stimuli or feedback, also called somatosensory stimuli or tactile feedback, is typically generated mechanically. In a typical embodiment of medicament delivery training device 10, there are a large number of somatic stimuli, such as actuation forces, abrasion resistance, frictional forces, spring compression, the feel of a click if two parts interlocking, surface texture, vibrations, weight sensation, and any other similar stimuli or feedback known to those of skill in the art.

A "predetermined value" as used herein, for example, includes but is not limited to a value or range of values relating to an event involving use or operation of the device. These may include, but are not limited to thresholds, ceilings, baselines or range values that are desired or undesired for a particular event. Examples of predetermined values include, but are not limited to, a predetermined orientation value, predetermined time value, or a predetermined contact value, in addition to other predetermined values described herein refers to a value that is used as a reference value in relation to a value, signal, or indication that is detected by, for example, a sensor of the delivery training device. Predetermined value may include an optimal value, or a sub-optimal value, any value there between, or any combination thereof.

In one example, a predetermined perpendicularity value may include a 90 degree angle between the device and a target region for the training device, an additional predetermined perpendicularity value may include a 10 degree angle between the device and a target region for the training device. At either predetermined perpendicularity value, or at any value there between, a signal output component may be initiated. The signal output component may therefore be an error message or a congratulatory message, for example.

The term "condition" as used herein includes but is not limited to one or a combination of user input, a status of the device, anything that is sensed by the device, correct or incorrect stepwise activities, usage of the device over time, among other conditions.

The term "error condition" as used herein includes but is not limited to one or a combination of condition pertaining to a mistake by the user in using the device, whether the mistake is incorrect positioning or contact between the device and the user, or whether the mistake is an out of order step, a step that exceeds or fails to meet predetermined time value (such as an undue pause during or between steps, or insufficient time for conducting a step or transition between steps). Error conditions may also include errors of the device itself, including low or lack of power or failure to operate as intended.

The term reconstituted as used herein includes a return of the components to their original state. For example, following use of the medicament delivery training device, once the device is in a post-delivery state, it can be reset for subsequent use. As part of the resetting of the training device from a post-delivery state to a pre-delivery state, the signal output components including audio, visual, olfactory, gustatory, and tactile are also reset back to their original states, or reconstituted, such that a subsequent training can be performed with the training device.

The term associated or association, as used herein, includes but is not limited to direct and indirect attachment, adjacent to, in contact with, partially or fully attached to, and/or in close proximity therewith. The term "in conjunction with" as used herein includes but is not limited to synchronously or near synchronous timing, the phrase may also include the timing of outputs, where one output directly follows another output.

Communication occurs between the user and the device via the signal output component and the control interface, for example. The medicament delivery training device can alert the user of different conditions of the device via the signal output component. An output of the signal output component of the device may be initiated, in one embodiment, in response to a predetermined elapsed time value occurring within the sequence of steps. In one example, the predetermined elapsed time value period includes a pause between steps of the instructions. The term "value" as used herein, may refer to a specific value or a range of values.

In another embodiment, an output from the signal output component may be initiated when the user correctly performs one or more steps in the sequence within a predetermined time period. This predetermined time period can be based on a predetermined average time period required to perform the steps of the sequence.

In other embodiments, the output may be initiated if an error in the use of the device occurs. In a further embodiment, when the device detects an error condition has occurred, an error message may be output to the user. In still a further embodiment, when the device detects the error condition, the device registers the error condition. When an error is detected by the device, a signal output is initiated to alert the user of the error. Errors are often detected by the device with the user of sensors, and often may be used to identify a mistake by the user in using the device, including but not limited to an out of sequence step in using the device, a failure to properly align the device before use, or use of the device in an incorrect location or orientation as identified by the sensors, in non limiting embodiments. The device may be configured to emphasize the step in which the user received an error message when that user returns to the step in the sequence so that the user can take additional care to avoid making the error in that step in subsequent trainings or before continuing on to complete the training.

Furthermore, in another embodiment when the user returns to a step in which an error condition occurred and/or was registered in a previous training, the instructions are provided with emphasis at that step. This serves to help the user through the step in which the previous error was made by emphasizing the instructions at that step to prevent future error at that step. The emphasis may be in the form of, in non-limiting embodiments, an augmented output by increasing the volume of the audible output, repeated instructions, a new script of instruction at that step, or providing instructions at that step at a slower pace, changing the characteristics of the output whether it be a flashing light wherein the rate of flashing changes, or a color change in a light, or providing a different audible sound such as a beep, a musical tone, or a different alarming sound, furthermore the output may include a vibration of the device or other such warning to the user as is known in the art.

The signal output component described herein includes sensory outputs provided to a user, including but not limited to visual stimulation, audio, vibration or tactile stimulation, a flavor, or a smellant or a fragrance, (olfactory simulation) among other possible sensory outputs. Signal outputs are used herein by the device and system to communicate with and provide feedback to the user. In one embodiment, the signal output component generates a visual output including at least one light or screen display, or a combination thereof. The visual stimulation or feedback may include visual output such as an LED and/or an LCD display, for example.

The display may provide information to the user about the medicament delivery training or simulation and about the medicament delivery training device. It may also provide information about the user's condition or any other type of information useful for the user. Other types of visual feedback known the art are contemplated within the invention herein.

In another embodiment, the signal output component of the device may generate an audio output, wherein the audio output may include a sound or a series of sounds. The audio output or feedback may include a beeping sound, a spoken instruction or an audible message, musical feedback, or any other type of audio output as known to those of skill in the art. In one embodiment, the medicament delivery training device is provided wherein a speaker is associated with the device for transmitting the audio output from the device. The speaker may be attached to the device, or the speaker may be wired or wirelessly connected to the device.

In another embodiment either olfactory (smellant) or gustatory (taste) feedback may be provided as a signal output by the device to communicate with the user. The olfactory and gustatory feedback may be presented in combination with one another or may be in combination with any of the other signal outputs described herein to improve learning and training of the user of the device. Furthermore, in some embodiments, the olfactory and/or gustatory feedback may be used to simulate the olfactory and/or gustatory output received from the medicament delivery device.

Other types of output or feedback provided by the device can include kinesthetic output such as clicks, locks, or actuation forces associated with the use of the device, or tactile output or feedback such as temperature change or vibration of the device, for example. Examples of tactile output can be found in U.S. Pat. No. 8,138,896. Many of the visual, auditory, and tactile outputs described herein are not necessarily only feedback to the user of the device, but can be prompts made by the device to a user to solicit user input or a user action, or to discourage user input or user action.

Any of the abovementioned outputs by the signal output component can be presented along with any of the other outputs of the device. For example, a visual and an audio stimulation or feedback may occur at the same time or within the same step of the training to enhance training of the user. Furthermore, the inventors have discovered that a combination of mechanical feedback (kinesthetic) and electronic feedback enhances the learning experience of a user when using the medicament delivery training device.

In another embodiment, the medicament delivery training device includes a sensor to detect a condition of the device, wherein an output of the device from the signal output component is initiated in response to a predetermined value for a condition. In one particular embodiment, the sensor may be an orientation sensor provided to detect an orientation of the device, wherein the signal output component is initiated if the orientation of the device meets a predetermined orientation. The orientation dictates the position of the medicament delivery training device relative to another object, for example, relative to the user during delivery. In some instances, particular injection devices must be oriented in a certain orientation such that the needle of the injector is beneath, in some instances, the body part being injected so as to avoid air bubbles in the medicament while in the device prior to its injection into the user. Certain medications may require certain modes of delivery or application, and may dictate the orientation of the device during delivery. The orientation sensor is useful in identifying the proper orientation for the device based on the medicament being administrated or the type of delivery device.

In another embodiment, a contact sensor may be provided to detect a contact or insufficient contact between the device and the user, wherein the signal output component is initiated if the contact of the device meets a predetermined contact value, or in other instances if the contact of the device fails to meet the predetermined contact value. This predetermined contact value may be set at 100% contact between the device and the portion of the body of the user being used for the delivery of the medicament, or the contact value may be set between 90-99%, or 80-88% contact such that a user can be made aware when there is sufficient contact between the device and the user for adequate delivery of the medicament from the device. The sensor can be configured to sense the angle between a longitudinal axis of the device and the surface of the user where the delivery of the medicament is to occur. Additionally, or alternatively, in some circumstances contact sensors may be provide don the portion of the device which is intended to contact the surface of the user where delivery of the medicament is to occur, therefore the contact sensor can alert the user when sufficient contact has been made. The contact sensor can also alert the user when sufficient contact has not been made with the surface of the user.

In another embodiment, the device includes a perpendicularity sensor provided to detect the perpendicularity of the device relative to a surface of the user, wherein the signal output component may be initiated if the perpendicularity of the device meets a predetermined perpendicularity value. The perpendicularity sensor can sense the angle created between a longitudinal axis of the device and the surface of the user where the delivery of the medicament is to occur. The predetermined perpendicularity value takes into account the best angle or range of angles provided between the device and the user within which to deliver the medicament. This value may vary based on the type of medicament being delivered. In some instances, a right angle between the device and the surface of the skin of the user may be the optimal perpendicularity value. However, in other instances, the predetermined perpendicularity value may range from a 10 degree angle to a 45 degree angle or a 50 degree angle to a 90 degree angle. Therefore, in some instances, the sensor is provided to detect correct alignment of the device during the simulation, as described above in one example of alignment is the perpendicularity of the device. Perpendicularity sensors which incorporate the use of a light on the device may be used to properly align the device relative to the user prior to use.

In a further embodiment, a location sensor may be provided to detect a correct location for the medicament delivery, wherein the signal output component is initiated if the location meets a predetermined location value. The location for the medicament delivery is important with a medicament in which the location for delivery on the body of the user must rotate from one place to another. Often times the recommended application of medicaments to the body requires rotation of the location of administration. For example, the first administration of the medicament may be on the arm, whereas the next application of the medicament may be on the thigh region, such that the locations of application on the body of the user are rotated. The movement of the location of the administration may prevent to some extent any one location from becoming overused, sensitive, bruised, or damaged over the course of the treatment.

Additional sensors of the medicament delivery training device include proximity sensors, resistive sensors, and tactile sensors, temperature sensors, alignment sensors, accelerometers, gyroscopes, and perpendicularity light sensors or any other sensor suitable for detecting one or more of the conditions associated with the device and for assisting the user in the proper use of the training device.

In some embodiments, the device may further include a skin type measuring device or module used to detect the type of skin of the user as is provided in US Patent Application Publication US 2008/0265170A1 by Ales et al, or any other type of skin type measuring device or module as known in the art. The device may also detect differences between skin at various locations on a body, differences between the skin of different age groups, ethnicities, genders, etc., to assist a user in determining a location for medicament delivery. In some embodiments, the device may record and informs a user of the last medicament application site and direct a user to the next medicament application site on the body; this information may be provided in a rotation. The device can additionally instruct a user on the optimal method for applying or injecting the medicament (subcutaneous, intramuscular, etc.), or the ideal location on the user for applying or injecting the medicament (buttocks, arm, thigh, etc.).

In another embodiment, the medicament delivery training device further includes a microprocessor. The circuitry of the device may include at least in part, the microprocessor, the signal output component for initiating audio, and visual, outputs, among other electronic components. The components may be operatively coupled by electrical conductors, however, in other embodiments the components may be operatively coupled without being physically connected. For example, in some embodiments, at least a portion of the components included in an electronic circuit system can be inductively coupled. In other embodiments, at least a portion of the components included in an electronic circuit system can be evanescently coupled.

The term "microprocessor" may include a single processing device or a plurality of processing devices. Such a processing device may be a microcontroller, digital signal processor, microcomputer, central processing unit (CPU), field programmable gate array (FPGA), programmable logic device, state machine, logic circuitry, analog circuitry, digital circuitry, and/or any device that manipulates signals (analog and/or digital) based on operational instructions. The microprocessor may have operationally coupled thereto, or integrated therewith, a memory device or a memory module. The memory device or memory module may be a single memory device or a plurality of memory devices. Such a memory device may be a read-only memory, random access memory, volatile memory, non-volatile memory, static memory, dynamic memory, flash memory, and/or any device that stores digital information. A computer, as used herein, is a device that comprises at least one processing module, and optionally at least one memory device. The memory module may be removable from the device and may include information regarding a condition of the user or the device, medical or non-medical information about the user, an error condition of the device, pre-loaded information or data (i.e. information or data stored on the device), information or data added to the device, information regarding sequence of steps and instruction information, as well as information or data regarding medicaments. The removable memory module may also contain the language information for guiding a user through the steps of the medicament delivery simulation.

The data storage modules may include a storage medium component(s) such as, but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a random access memory (RAM), a read-only memory (ROM), an erasable programmable read-only memory (EPROM or Flash memory), an optical fiber, a portable compact disc read-only memory (CD-ROM), a DVD (digital video disk), or other electronic storage medium.

Computer program code modules for carrying out the logic or operations of certain embodiments of the present invention may be written in an object oriented, procedural, and/or interpreted programming language including, but not limited to, Java, Smalltalk, Perl, Python, Ruby, Lisp, PHP, "C", FORTRAN, Assembly, or C++. The program code modules may execute entirely on the device, partly on the device, as a stand-alone software package, partly on the device and partly on a remote computer or device or entirely on the remote computer or device. In the latter scenario, the remote computer or device may be connected to the user's device through a local area network (LAN) or a wide area network (WAN), or the connection may be made to an external computer (for example, through the Internet using an Internet Service Provider).

The circuitry of the device may include a flexible printed circuit board to electronically couple with the components contained therein. The circuitry may be disposed in any suitable manner relative to the housing of the device, or may be associated with the housing of the device. In some embodiments, for example, the circuitry can be integrated with the simulated medicament delivery training device. The circuitry can be contained within the housing, and/or it may be partially or fully assembled concurrently with and/or with the same processes of the medicament delivery training device, the circuitry may alternatively or in addition be provided on the outer portion of the housing of the device.

In yet another embodiment, a non-transitory computer-readable medium embedded in a medicament delivery training device is disclosed. The non-transitory computer readable medium stores instructions executable by the microprocessor or another processing device to cause the processing device to output audio via the signal output component in the medicament delivery training device in response to an activation of a responsive member on a control interface, for example, to guide a user through the sequence of steps of the instructions for operation of the medicament delivery training device.

Some embodiments of the invention relate to a computer storage product with a computer-readable medium having instructions or computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic storage media such as hard disks, floppy disks, and magnetic tape; optical storage media such as Compact Disc/Digital Video Discs ("CD/DVDs"), Compact Disc-Read Only Memories ("CD-ROMs"), and holographic devices; magneto-optical storage media such as floptical disks; carrier wave signals; and hardware devices that are specially configured to store and execute program code, such as Application-Specific Integrated Circuits ("ASICs"), Programmable Logic Devices ("PLDs"), and ROM and RAM devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

Certain embodiments of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program code modules. These program code modules may be provided to a processing module of a general purpose computer, special purpose computer, embedded processor or other programmable data processing apparatus to produce a machine, such that the program code modules, which execute via the processing module of the computer or other programmable data processing apparatus, create means for implementing the functions specified in the flowchart and/or block diagram block or blocks.

Powering on the device, in some non-limiting embodiments, initiates or activates the sequence of instructions to the user. However, the instructions may be initiated or activated by any suitable means known in the art. For example, in another embodiment, activation of the actuation member or removal of a protective cap or cover may initiate the sequence of instructions of the device. In yet another embodiment, the sequence of steps of instructions may be initiated by moving the device, which may be recognized via a motion sensor on or associated with the device. In still another embodiment, a user input via the responsive member of the device may activate or initiate the instructions.

The control interface of the device may provide the user with the ability to change the language of the audio output of the device. Languages that the audio output may be communicated to a user include but are not limited to, English, Spanish, French, Arabic, Portuguese, Russian, Chinese, and Japanese. It is known by those of skill in the art that any language may be provided via the audio output of the device.

As described above, the medicament delivery training device embodiments provided herein may further include at least one responsive member that is reactive to user input. The responsive member may include a button, either virtual or non-virtual, a switch, a touch sensor, a toggle, a heat or tactilely sensitive response sensor, or any combination thereof, or any other such device as known in the art. The responsive member may be part of the control interface of the device. Alternatively, or in addition to being disposed on the device, the at least one responsive member can be in association with the device. The control interface can be used for generating user commands, and the circuitry disposed within the device or in association with the device may be in communication with the control interface. The circuitry may be embodied as a processor-based circuit, wherein it is configured and arranged to receive input from the user via the control interface, wherein the processor-based circuit includes an audio signal processor configured and arranged to provide audio to the user to instruct the user while using the medicament training delivery device during the medicament delivery simulation or training, wherein the audio is controlled by the responsive member on the control interface via user input.

In one embodiment, the medicament delivery training device may be connected to an external source, such that information can be communicated to and/or from the device. In another embodiment, the information communicated to and/or from the device includes at least one computer readable file. Such files may include videos not limited to but including training videos. Other information which may be communicated to and/or from the device includes information regarding performance of the user in using the device, trending data regarding the use of the device and the operation of the device itself, software information, updated software, language software information, and any other information that would be beneficial to the use and/or operation of the device. The communication of information or data to and/or from the device may occur via a wire or wireless connection, and the information may be communicated to and/or from a network, a computer, a system, or to and/or from another device.

In another embodiment, the device includes a program code module wherein the module records a condition of the device, wherein the condition may include user compliance or user incompliance with proper use of the device. Other conditions of the device which may be recorded include a user input, a status of the device, anything that is sensed by the device, correct or incorrect stepwise activities, usage of the device over time, among other conditions. In an embodiment, the program code module can be incorporated as part of the device, connected to the device, in communication with the device, or in sync with the device. For example, when a user is not using the medicament delivery training device on a regular basis (regular basis can be identified by a predetermined, pre set time period), the device will record the usage of the device, and may be configured to alert a user or an outside personnel such as a physician, for example, of the recorded usage. The alert may indicate the amount of training or simulation that has been recorded by the device, or the accuracy or inaccuracy with which the device is being used. Examples of user compliance which may be recorded by the device include correct and incorrect use of the device. The program code module can be used to indicate to the user or outside personnel, a physician for example, whether the user is correctly and accurately using the device.

Alternatively, or in addition, the program code module may provide the user information relating to his or her use of the device including the amount of training or simulation accomplished as well as feedback regarding the quality of training or simulation recorded. The program code module may also provide the user of the device with areas of improvement in the medicament delivery simulation steps, or may provide the user with positive feedback regarding areas where the user has complied with the steps or use of the device. The program code module can include a records and statistical analysis feature, and can download and/or transfer records to and from the device. This program code module may be helpful in research and development of the device. With the use of the program code module recording and tracking various features and uses of the device, one can readily determine areas in which the device may be improved. The program code module also includes graphing capability of recorded data, as well as data trending results of the performance of the device and/or the user, the efficiency of the user and of the device in training and/or simulation. As part of the program code module, features such as an alarm or indication (visual, auditory, tactile . . . etc.) to the user of the device or to another can be initiated if the data received and analyzed by the module is out of range or is trending out of range (a range will be pre-determined).

As will be appreciated by one of skill in the art, certain examples of the present invention may be embodied as a device or system comprising a processing module, and/or computer program product comprising at least one program code module. Accordingly, the present invention may take the form of an entirely hardware embodiment or an embodiment combining software and hardware aspects, commonly known as firmware. As used herein, firmware comprises a computer program module that is embedded in a hardware device, for example a microcontroller. It can also be provided on flash memory or as a binary image file that can be uploaded onto existing hardware by a user. As its name suggests, firmware is somewhere between hardware and software. Like software, it is a computer program which is executed by a microprocessor or a microcontroller, but it is also tightly linked to a piece of hardware, and has little meaning outside of it.

In a further embodiment, the medicament delivery training device is provided wherein the circuitry has one or more registers. In one particular embodiment, the one or more registers include a step number (CS), a current language (CL) and a current error (CE) as demonstrated in FIG. 4 as described in more detail below.

In another embodiment of the device, the sequence of steps of the instructions may be interrupted and a previous step in the instructions can be played. In yet another embodiment, if no error condition is detected at a last step in the sequence of instructions, the device may be powered off.

In an embodiment, the medicament delivery training device mimics actual delivery, however, in the simulated delivery, no therapeutic fluid or material or medicament is ejected from the medicament delivery training device or applied to the user.

In still a further embodiment, the medicament delivery training device is provided wherein the delivery training device has a pre-delivery state and a post-delivery state and a medicament delivery simulation mechanism disposed within the delivery training device. The medicament delivery simulation mechanism has a first position when the device is in the pre-delivery state and a second position when the device is in the post-delivery state. In yet another embodiment, the housing of the medicament delivery training device comprises an actuation member to simulate delivery of a medicament from the device, and wherein the medicament delivery simulation mechanism is associated with the actuation member such that when the actuation member is actuated, the medicament delivery simulation mechanism is urged from the first position to the second position, and wherein the medicament delivery simulation mechanism can be reset from the second position to the first position for reuse of the medicament delivery training device. In a further embodiment, the first position is a retracted position, and the second position is a protracted position. The mechanism mimics the actual medicament delivery process so as to prepare the user with the sound, feel, and other senses experienced during the medicament delivery process with as much similarity as possible such that any anxiety associated with the actual medicament delivery, whether by injection or topical or by any other means known in the art, is reduced or for the user. The medicament delivery simulation member, in other embodiments, may comprise a sheath or other such member to simulate the tactile feel of a medicament delivery device.

Following actuation of the device, a re-setting of the device may be necessary. This can be accomplished manually and mechanically, in one example, by pressing the portion of the device with the ejected medicament simulation member against a surface until the ejected member is re-inserted into the housing of the device.

In another embodiment, the medicament delivery simulation mechanism comprises a medicament delivery simulation member configured to extend through an opening in the housing of the device when the medicament delivery simulation member is actuated by actuating the actuation member, forcing the member through the opening, such that the medicament delivery simulation member simulates the force and motion of a medicament delivery member without delivering medicament to the user. In a further embodiment, the medicament delivery simulation member moves from a retracted position in the housing of the device to a protracted position, extending through the opening in the housing of the device. In still a further embodiment, when the medicament delivery simulation mechanism is reset from the second position to the first position, and the training device is reset from the post-delivery state to the pre-delivery state, visual, auditory, or tactile feedback of the medicament delivery simulation mechanism, or any combination thereof, is reconstituted for a subsequent training.

In yet a further embodiment, the medicament delivery training device includes a memory module for recording a condition of the device. In some embodiments, the memory module is a memory storage module associated with the device, which may be either a removable or a non-removable memory storage module. Memory contained in this module may include various languages of audio, updating information for the device, information about various medical conditions and medicaments including usage, storage, and any other important information associated therewith. The memory module may further comprise a script for guiding the user through the steps of the medicament delivery simulation. The script may be provided in any language as described above.

In still a further embodiment, the device provides trending results based on the recorded use of the device by the user. The trending results may be provided to the user or to a third party such as a doctor's office, for example. These trending results can help the user and others determine the user's progress in the use of the device and can also indicate weak or strong areas in the use of the device and throughout the self-administration or medical delivery process. The trending results as well as the results recorded by the memory module above can provide a benefit in the manufacturing process to provide for adjustments, for example, where certain mistakes are often made by users at certain points of the training process the device can be adjusted accordingly.

When the medicament delivery training device changes from a pre-delivery state to a post-delivery state, tactile feedback, visual feedback, gustatory feedback, olfactory feedback, or auditory feedback, or any combination thereof, of the training device mimics the tactile, visual gustatory feedback, olfactory feedback, and auditory feedback of an actual medicament delivery device, in one embodiment. In a further embodiment, the tactile, visual, gustatory, olfactory, and/or auditory feedback of the training device are output in conjunction with one another to simulate the tactile, visual, gustatory, olfactory, and/or auditory feedback of a medicament delivery device. In a further embodiment, the medicament delivery training device is configured to power off after a pre-set time period.

Exemplary embodiments of the medicament delivery training device can be implemented to educate users on the proper operation and usage of a medicament delivery device. The training device can be used to make prospective and current users of medicament delivery devices feel more comfortable and confident in self-administration of medicaments, and can help users understand the proper steps of medicament delivery. Exemplary embodiments of the medicament delivery training device can be used by a user before the user administers an auto-injection using an actual automatic injection device corresponding to the automatic injection training device and/or can be used as needed or desired by the user. Other exemplary embodiments of the invention herein pertain to manual injection devices and manual injection training devices used by the user.

In a further embodiment, the medicament delivery training device includes an indicator which conveys information about a predetermined status of the device, or a condition of the device. Additionally, in an embodiment, the indicator may indicate but is not limited to an indication that that the medicament delivery simulation is complete or incomplete. The indication may be conveyed by audio, visual, tactile, or a smellant indication, or a combination thereof. The visual indicator may be disposed on the device or may be connected by a wire or wirelessly to the device. The visual indicator may be embodied as, but is not limited to, an LED light. In an example, the housing may include one or more display windows, through which a visual indicator can appear to simulate or mimic completion of an injection.

In one embodiment, the medicament delivery training device may further include a reminder feature to remind the user to use the device by initiating a signal output. The reminder can be initiated by the signal output of the device, and as described above can be auditory, visual, tactile or any other type of output described in other embodiments herein, and any additional output known to those of skill in the art. The reminder feature of the device may also remind a user of an upcoming appointment with a physician appointment, or appointment with another health care professional.

In another embodiment, the safety mechanism of the device prevents unintended actuation of the actuation member, and can include a manual lock and unlock safety lock, a button on the device which locks and/or unlocks the device, a safety cap which prevents unintentional actuation of the device when it is placed over top of the actuation device, or any other safety mechanisms to prevent unintended actuation of the actuation member as known in the art.

Although the medicament delivery devices have been shown and described above as being primarily single-use medicament delivery training devices, in some embodiments a medicament delivery training device can include any suitable device for delivering one or more doses of a medicament to a patient, or one or more medicaments to a patient. In some embodiments, a medicament delivery device can be an injector containing multiple doses of a chronic-care medicament, such as, for example, insulin. In such embodiments, an electronic circuit system can output instructions associated with not only an initial use of the medicament delivery device, but also associated with repeated uses, dosage monitoring or the like. In other embodiments, a medicament delivery device can include a transdermal medicament delivery device, an inhaler or a nasal medicament delivery device.

In yet another embodiment, the medicament delivery training device may be configured to simulate single dose or multi-dose medicament delivery. The device may track the number of doses dispersed by the device (i.e., by accumulated depletion).

In trying to simulate an actual medicament delivery device and system, the device herein requires a certain force by the user for activation of the device. Multiple forces can be simulated by the device such as the force that must be used (e.g. manual, spring loaded, electric motor, pneumatic cartridge, ultrasonic) to force a needle to puncture the skin in an injector or an auto-injector device. In another example, a different force may be needed to disperse a medicament from a medicament delivery device onto the surface of a skin of a user. The medicament delivery training device can vary to compensate for these different forces so as to replicate the force of the actual medicament delivery device being simulated. Additional forces such as that used to push a fluid through the needle of a medicament delivery device (manual, spring loaded, electric motor, pneumatic cartridge, ultrasonic) can also be simulated by the medicament delivery training device so as to reduce anxiety of the user in using the medicament delivery device.

In another embodiment, a medicament delivery training device configured to provide instructions for using the device to a user in a sequence of steps is provided. The medicament delivery training device includes a housing, a sensor, a microprocessor, a signal output component to provide an output to the user, a storage medium component associated with the microprocessor comprising a database of instructions pertaining to the sequence of steps for using the device stored thereon, and one or more program code modules stored on the microprocessor or the storage medium component wherein the one or more program code modules comprise a first program code module for causing the microprocessor to provide a first instruction, and a second program code module for causing the microprocessor to provide a subsequent instruction based on a current register.

In a further embodiment, the medicament delivery training device is provided wherein the current register comprises information about a current step number, a current error condition and/or a current language.

In still a further embodiment, the medicament delivery training device is provided wherein the current register comprises information about a current step number and a current error condition. In yet a further embodiment the medicament delivery training device is provided wherein based on an input received from the sensor, the microprocessor determines whether an error has occurred. In still a further embodiment, when an error has occurred, the microprocessor sets a current error in the current register. The current error or the error condition as described herein may be based on inputs from multiple sensors. In yet a further embodiment, when an error has occurred, an error message is output to the user.

In another embodiment, the medicament training device is provided, wherein the signal output component includes one or more speakers, and wherein the instructions are provided to the user by way of an audio output.

In another embodiment, the medicament training device is provided wherein the signal output component includes at least one or more visual stimuli such that the instructions are provided to the user by way of a visual output.

In a further embodiment, when a last instruction of the sequence of steps is executed, the device is powered off.

In another embodiment, the error condition is determined based on the sensor input and/or a condition of the device relative to at least one predetermined value for the condition of the device stored on the storage medium component. In a further embodiment, the medicament training device may include two or more sensors, wherein two or more inputs are received by the microprocessor from the two or more sensors. The device may include two or more predetermined values for a condition of the device stored on the storage medium component.

In a further embodiment, a third program code module causes the microprocessor compare the condition of the device with at least one predetermined value for the condition of the device. In still a further embodiment, a control interface is associated with the device, the control interface includes at least one responsive member reactive to user input. More than one responsive member reactive to user input may be provided. The responsive member(s) may include a button, toggle, switch, a digital button, a pressure sensor or other type of sensor, or any other type of responsive member known to those of skill in the art to receive input.

In still a further embodiment the at least one responsive member is configured to receive input to set a current language of the device, return to a previous instruction in the sequence of steps instructions upon selection, and/or pause the instructions upon selection.

In a further embodiment the device is configured to power off after a pre-set time period. In another embodiment, the medicament delivery training device is provided wherein when no error condition is detected at an instruction of the sequence of steps, the current step number increases by one. In still another embodiment, the medicament delivery training device is provided wherein when the user correctly performs the step at which an error condition previously occurred, a fourth program code module causes the microprocessor to execute a positive feedback to the user. The positive feedback to the user may also be executed during a first encounter of the instruction by the user, when the user correctly performs the step.

Turning to the Figures, FIG. 1 provides a schematic of an embodiment 100 of the medicament delivery training device 10. The device 10 includes a housing 12, an activation module 14, a control interface 16 for operation by a user and circuitry 18. The device 10 further includes responsive members 20 which are responsive to user input. A signal output component 22 is provided for communication with the user via visual, audio, tactile, and other signals. A medicament delivery simulation member 32 is provided in some embodiments to simulate an actual medicament delivery device, particularly where the medicament delivery training device 10 simulates an injector and/or an auto-injector delivery device.

Figure 2:
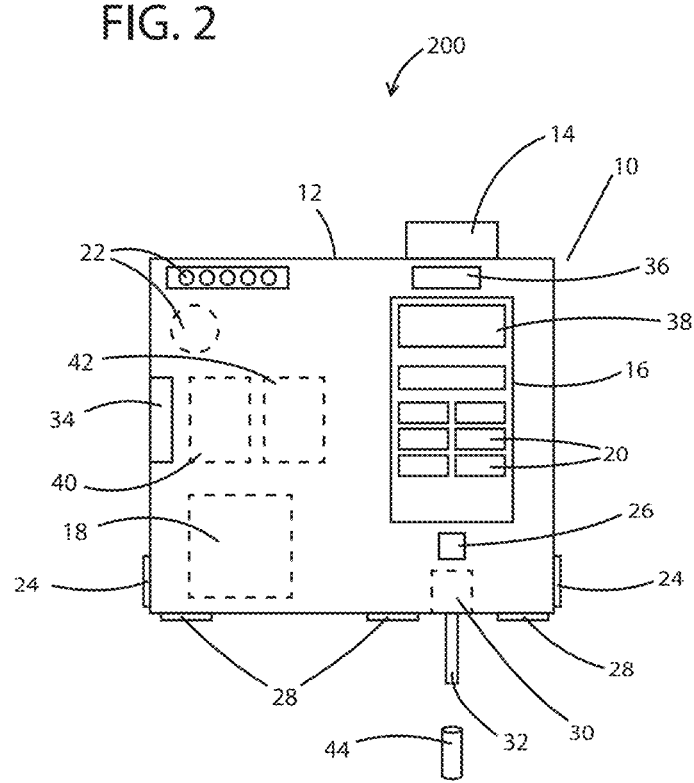
FIG. 2 provides a schematic of another embodiment of the medicament delivery training device.

In FIG. 2, a schematic of another embodiment 200 of the medicament delivery training device 10 is provided. This embodiment 200 includes the elements discussed in the embodiment above, and additionally includes a perpendicularity sensor 24, orientation sensor 26, and contact sensor 28 to orient the device properly before, during, and after use. An opening 30 is shown in the embodiment 200 which provides a space for the medicament delivery simulation member 32. A memory module 34 is provided as well as an indicator 36 and a display 38 in the embodiment 200. Furthermore, a program code module 40 records a condition of the device 10. The microprocessor 42 is provided as well as a safety mechanism 44 embodied as a cap in FIG. 2, however the safety mechanism 44 may take any shape so as to prevent injury or unwanted contact with the medicament delivery simulation member 32.

FIG. 3 provides a flowchart illustrating an exemplary operation of an embodiment of the circuitry 18 associated with the medicament delivery training device 10. The circuitry 18 as shown in the embodiment of FIG. 3 is recursive. A user can press the start button 46 to actuate the circuitry 18, which will then proceed to the first step in the sequence (step number=1) 48. The circuitry 18 will play a spoken script of the current instruction 50, selected according to a set of registers (as shown in FIG. 4). In this exemplary embodiment, there are three registers; current step number (CS) 61, current language (CL) 63, and current error (CE) 65.

At this point the user has the option to interrupt the script to change the language 52 to set the current language 53, to interrupt the script to return to a previous instruction 54, wherein the system will return to a previous step in the sequence (step number=step number−1) 55, or to interrupt the script 56 by selecting the pause button 56 to pause the script. The medicament delivery training device provides a user the ability to move from one instruction back to a previous instruction. If the start/pause selection is input once, there is a 30 second delay 78 in the script before any additional input, the system will automatically turn itself off 66. If the user selects the pause button a first time 56 and then a second time 56, the system will go to a point of pause 74. This allows a user to process the instruction for a period of time, improving memory and learning through the training. In another embodiment, the start and/or pause buttons may be embodied as one button or feature of the device or multiple buttons or features of the device. After the point of pause 74, the system returns to play the script according to current register 50. If the current step is not the last step in the sequence, then the subsequent step is played in the sequence. The 30 second delay described in the steps above is not limited to a 30 second delay, but may include any predetermined or preset time period.

If no additional user input is provided after one of the three aforementioned selections (interrupt language 52, interrupt previous 54, or interrupt start/pause 56), the system determines whether an error condition is detected 58. This determination requires information received from at least one sensor 60 and/or at least one predetermined value 62. If no error condition is detected at step 58, and the circuitry 18 determines that it is at the last step in the sequence 64 the system is powered off 66. If it is not the last step in the sequence, the script is played according to current register 50. If an error condition is detected at step 58, the circuitry 18 initiates an error message to be played 68 and a current error to be set (registered) 70, wherein the system returns to the first step 48 in the sequence to begin the sequence again.

FIG. 4 provides an exemplary embodiment of a series of instructions provided by the medicament delivery training device according to the circuitry 18 provided at step 50 of the circuitry of FIG. 3. The circuitry 18 will play a spoken script of the current instruction 50, selected according to a set of registers. In this exemplary embodiment, there are three registers; current step number (CS), current language (CL), and current error (CE).

For example, the exemplary embodiment can play six spoken scripts of instructions. The exemplary embodiment can do so in two languages. In addition, circuitry 18 of the exemplary embodiment can play a normal spoken script, or a spoken script with extra emphasis. Selection between the normal spoken script and the script with emphasis is explained below. If there are six spoken scripts of instructions, in two languages, and two levels of emphasis, then there are a total of 24 instruction scripts, as shown in FIG. 4. For example, if CS=1, CL=0, and CE=0, circuitry 18 plays a normal spoken script of instruction of current step 1, in English.

The state of the registers is determined by what the user does next. If the user does not push any buttons (no interrupt), then the algorithm as depicted in FIG. 3 will go to the next step. Thus, the current step number (CS) increases by 1 before the circuitry plays a spoken script of an instruction (in effect, the next instruction). If algorithm logic 58 determines that the user has made an error (i.e., an error condition is detected), then the CE register is set from 0 to 1. In that case, the next time circuitry 18 plays the spoken script of an instruction, it will do so with a script that has more emphasis. For example, an instruction with no emphasis may say, for example: "please remove the first cap." An instruction with extra emphasis may say, for example: "the last time at this step, you took the second cap off before you took the first cap off. Please pay attention to taking the caps off in the right sequence. Now remove the first cap". If the user pushes the language button (interrupt), then the CL register is set from 0 to 1. It will play the other language—Spanish in the case as shown in FIG. 4—until the user pushes this button again and resets the CL register from 1 to 0. Note that the number of registers, the number of instructions, and the number of languages can be any number. Also, it is possible to have more than two levels of emphasis.

Figure 5:
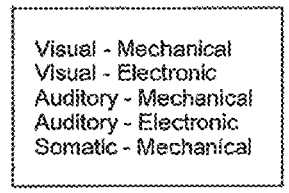
FIG. 5 is a diagram outlining exemplary states of the medicament delivery training device.

FIG. 5 provides a diagram outlining exemplary states of the medicament delivery training device from the pre-delivery state to the post-delivery state. At the beginning of the training cycle, the device is in a pre-delivery state and the medicament delivery simulation mechanism is in a first position. In some instances this first position is a retracted position, particularly in an embodiment where the medicament delivery training device is an injection training device. The next step in the cycle is the medicament delivery training cycle, wherein once the training cycle is complete, the device reaches the post-delivery state. In the post delivery state, the medicament delivery simulation mechanism is in a second position, which in some instances is a protracted position. At this point in the cycle, the device can be re-set prior to the next training cycle.

Figure 6A:
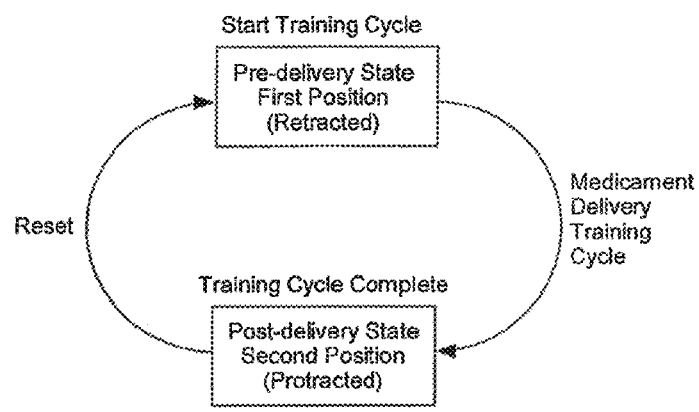
FIG. 6A provides a grouping identifying the sources of feedback provided within one housing of the medicament delivery training device.

FIG. 6A provides a grouping identifying the sources of feedback provided within one housing embodiment of the medicament delivery training device, wherein visual and auditory feedback can be provided either mechanically or electronically, and somatic feedback is provided mechanically.

Figure 6B:
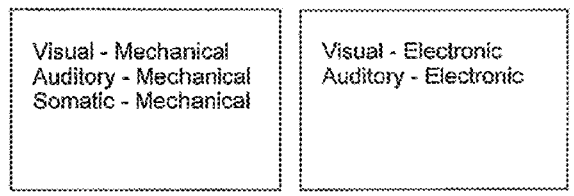
FIG. 6B provides a grouping identifying the sources of feedback of the medicament delivery training device may be provided in more than one housing.

FIG. 6B provides a grouping identifying the sources of feedback of the medicament delivery training device may be provided in more than one housing. In this embodiment, the mechanical feedback (visual, auditory and somatic) are provided in a first housing, and the electronic feedback (visual, auditory) are provided in a second housing.

A visual output as disclosed herein includes but is not limited to a light, a display, a colorometric display system, a change in position of the device or any other type of visual cue to the user of the device. The visual output is associated with the device, therefore it may be disposed on the device or provided in connection with the device either by a wire or wirelessly.

An audio output as disclosed herein includes but is not limited to music, a sound, a beep, a series of beeps music or sounds, a mechanical sound including clicking, a sound replication of operation or behavior of an actual medical delivery device.

The term "connected" as used herein includes wireless or hard wire connection. The external source includes a database, a remote computer, and also includes communications with another device, a network, and any other means of communication or transfer of information known in the art. Connected may further refer to a direct surface to surface connection between the device and another surface or an indirect contact there between. In some embodiments, the device may communicate with a remote device either via a wired or a wireless connection. The remote device may be, for example, a remote communications network, a computer, a cell phone, a personal digital assistant (PDA) or the like. Such an arrangement can be used, for example, to download replacement processor-readable code from a central network to the memory module or other memory of the device. In some embodiments, the circuitry of the device can download or obtain information associated with a medicament delivery device or medicament, such as an expiration date, a recall notice, updated use instructions or the like.

The network interface can be configured to transmit information to and/or from the circuitry of the device to and/or from a central network, such as, for example, an emergency response network. In some embodiments, for example, the device can notify an emergency responder when and how a medicament delivery training device is used. In other embodiments, the device can transmit information to and/or from a third party, such as a physician, an emergency contact and/or the manufacturer of a medicament device, when and how the medicament delivery training device is used. Such information can include, for example, the location of use, the date and/or time of use, the efficiency of use including conditions and errors of use, or the like.

An indicator as described herein can be used to indicate to a user that a step or that the entire simulation is complete, or that the step or simulation is nearing completion. The indicator can also indicate predetermined statuses including elapsed time, and insufficient time between steps, for example. There may be one or more indicators, and each indicator may provide an indication to the user that the medicament delivery simulation is complete by an audio, visual, tactile, or a smellant (olfactory) indication, taste indicator (gustatory), or a combination thereof.

The preferred embodiment of medicament delivery training device 10 may have multiple architectures, based on space available to accommodate mechanical and electronic components. Each architecture may hold multiple sources of visual, auditory, and somatic stimuli.

Portions of the device can be provided in a separate housing, for example some components of the device can be in one housing and others can be outside the housing or in a second, third, fourth housing, etc. One skilled in the art would appreciate that some components of the device may be in one location and others in another location in light of the teachings of the disclosure herein. The term "device", therefore, as used herein includes one or more components. In a typical embodiment, the medicament delivery training device cannot deliver medicament.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the following definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

What is claimed is:

1. A medicament delivery training device configured to provide instructions for using the device to a user in a sequence of steps, the medicament delivery training device comprising:
   a housing;
   two or more sensors;
   a signal output component for providing an output to the user;
   a microprocessor;
   a storage medium component associated with the microprocessor comprising a database of instructions (i) wherein each instruction is assigned a tag relating to current register and a current error, (ii) wherein based on an input received from the two or more sensors, the microprocessor determines whether the user has performed a step out of sequence, (iii) wherein when an out of sequence error has occurred, the microprocessor sets a current error in the current register, and (iv) wherein when no error condition is determined for a current step, the current step number increases by one; and
   one or more program code modules stored on the microprocessor or the storage medium component wherein the one or more program code modules comprise
   a first program code module for causing the microprocessor to select from the database a first instruction according to a first tag; and
   a second program code module for causing the microprocessor to select from the database a subsequent instruction based on a second tag.

2. The medicament training device of claim 1, wherein the signal output component comprises one or more speakers, and wherein the instructions are provided to the user by way of an audio output.

3. The medicament training device of claim 1, wherein the signal output component comprises at least one or more visual stimuli such that the instructions are provided to the user by way of a visual output.

4. The medicament delivery training device of claim 1, wherein when a last instruction of the sequence of steps is executed, the device is powered off.

5. The medicament delivery training device of claim 1, wherein the error condition is determined based on the output of the two or more sensors relative to at least one predetermined value for the two or more sensors as stored on the storage medium component.

6. The medicament delivery training device of claim 1, further comprising a control interface associated with the device, the control interface comprising at least one responsive member reactive to user input.

7. The medicament delivery training device of claim 6, wherein the at least one responsive member is configured to receive input to set a current language of the device.

8. The medicament delivery training device of claim 6, wherein the at least one responsive member is configured to receive input to return to a previous instruction in the sequence of steps upon selection.

9. The medicament delivery training device of claim 6, wherein the at least one responsive member is configured to pause the instructions upon selection.

10. The medicament delivery training device of claim 1, wherein the device is configured to power off after a pre-set time period.

11. The medicament delivery training device of claim 1, wherein when the user correctly uses the device according to the subsequent instruction, a third program code module causes the microprocessor to execute a positive feedback to the user.

12. The medicament delivery training device of claim 1, wherein one or more sources of feedback can be provided in one or more housings of the device.

13. The medicament delivery training device of claim 1, comprising a fourth program code module to record and/or track one or more conditions of the device, uses of the device, error conditions of the device, data trending results of the performance of the device and/or the user, and efficiency of the user and/or of the device.

14. The medicament delivery training device of claim 6, wherein the responsive member comprises a button, a toggle, a switch, or a digital button, or a combination thereof.

15. A medicament delivery training device configured to provide instructions for using the device to a user in a sequence of steps, the medicament delivery training device comprising:
   a housing;
   one or more sensors;
   a signal output component for providing an output to the user;
   a microprocessor;
   a storage medium component associated with the microprocessor comprising a database of instructions (i) wherein each instruction is assigned a tag relating to current register and a current error, (ii) wherein based on an input received from the one or more sensors, the microprocessor determines whether the user has performed a step out of sequence, (iii) wherein when an out of sequence error has occurred, the microprocessor sets a current error in the current register, and (iv) wherein when no error condition is determined for a current step, the current step number increases by one; and
   one or more program code modules stored on the microprocessor or the storage medium component wherein the one or more program code modules comprise
   a first program code module for causing the microprocessor to select from the database a first instruction according to a first tag;
   a second program code module for causing the microprocessor to select from the database a subsequent instruction based on a second tag; and a third program code module to record usage of the device over a predetermined time and to output information to the user about an amount of training or accuracy of usage.

16. The medicament delivery training device of claim 15, wherein the device outputs information about quality of training, areas of improvement, and/or positive feedback about areas where the user has complied with the use of the device.

17. The medicament delivery training device of claim 15, further comprising a fourth program code module that causes the microprocessor to transfer recorded information via a wire or wireless connection to a network, a computer or to another device.

* * * * *